US006142328A

United States Patent [19]

Sterner

[11] Patent Number: 6,142,328

[45] Date of Patent: Nov. 7, 2000

[54] DECORATIVE UNIT STRUCTURE

[75] Inventor: Marion Sterner, Rosenheim, Germany

[73] Assignee: Lucky Star Enterprise & Co., Ltd., Taipei, Taiwan

[21] Appl. No.: 09/292,883

[22] Filed: Apr. 16, 1999

[51] Int. Cl.$^{7}$ .......... B32B 1/02

[52] U.S. Cl. .......... 220/4.21; 248/150; 248/165; 431/289; 428/34.1

[58] Field of Search .......... 428/99, 34.1; 431/289; 248/164, 165, 150; 220/4.34, 4.28, 4.25, 4.21, 4.24

*Primary Examiner*—Alexander S. Thomas
*Attorney, Agent, or Firm*—Dougherty & Troxell

[57] ABSTRACT

A decorative unit structure composed of a first decorative unit and a second decorative unit separably combined with each other is diclosded. The center of the bottom of the first decorative unit is formed with a central extension post. Two sides of the bottom of the second decorative unit are formed with two extension posts spaced from each other by a certain distance. A bight bottom edge is defined between the two extension posts. When combining the first decorative unit with the second decorative unit, the central extension post of the first decorative unit is extended into the space between the two extension posts of the second decorative unit to form an inter-engaged structure having three supporting points which enable the first and second decorative units to be stably rested on a plane face. After combined, the first and second decorative units define therebetween a receiving room for a decorative article to rest therein.

2 Claims, 5 Drawing Sheets

DECORATIVE UNIT STRUCTURE

BACKGROUND OF THE INVENTION

1. Field of the Invention

The present invention relates to a decorative unit structure composed of two casing-like decorative units which are separably combined with each other. The bottoms of the two decorative units are formed with leg-like projections serving as inter-engaged structures and supporting points enabling the decorative unit structure to be rested on a plane face.

2. Description of the Prior Art

Decorative articles are placed in a home or an office to beautify the environment and achieve a visual entertaining effect. The commercially available decorative articles (such as dolls, plastic flowers, patterned pen cases, etc.) are generally designed with monotonous profiles and simple appearance.

Also, the existing candle stand is simply used as a stand on which a candle is rested. On those situations in which candles and candle stands are often used (such as birthday party, restaurant, etc.), the conventional candle stands can hardly achieve a novel visual effect. Therefore, it is necessary to provide a unique candle stand which not only serves as a candle stand, but also serves as a decorative article cooperative with the candle to achieve a distinctive effect.

SUMMARY OF THE INVENTION

It is therefore a primary object of the present invention to provide a decorative unit structure composed of two casing-like decorative units which are separably combined with each other. The decorative units can be formed with various patterns. After combined, the structure not only serves as a decorative article, but also serves as a stand on which another decorative article can be rested.

It is a further object of the present invention to provide the above decorative unit structure composed of a first and a second decorative units having inter-engaged structures. After combined, the first and second decorative units define therebetween a receiving room in which a decorative article can be rested.

To achieve the objects described above, the center of the bottom of the first decorative unit is formed with a central extension post. Two sides of the bottom of the second decorative unit are formed with two extension posts spaced from each other by a certain distance. A bight bottom edge is defined between the two extension posts. When combining the first decorative unit with the second decorative unit, the central extension post of the first decorative unit is extended into the space between the two extension posts of the second decorative unit to form an inter-engaged structure having three supporting points which enable the first and second decorative units to be stably rested on a plane face.

The present invention can be best understood through the following description and accompanying drawings wherein:

DETAILED DESCRIPTION OF THE PREFERRED EMBODIMENTS

Figure 1:
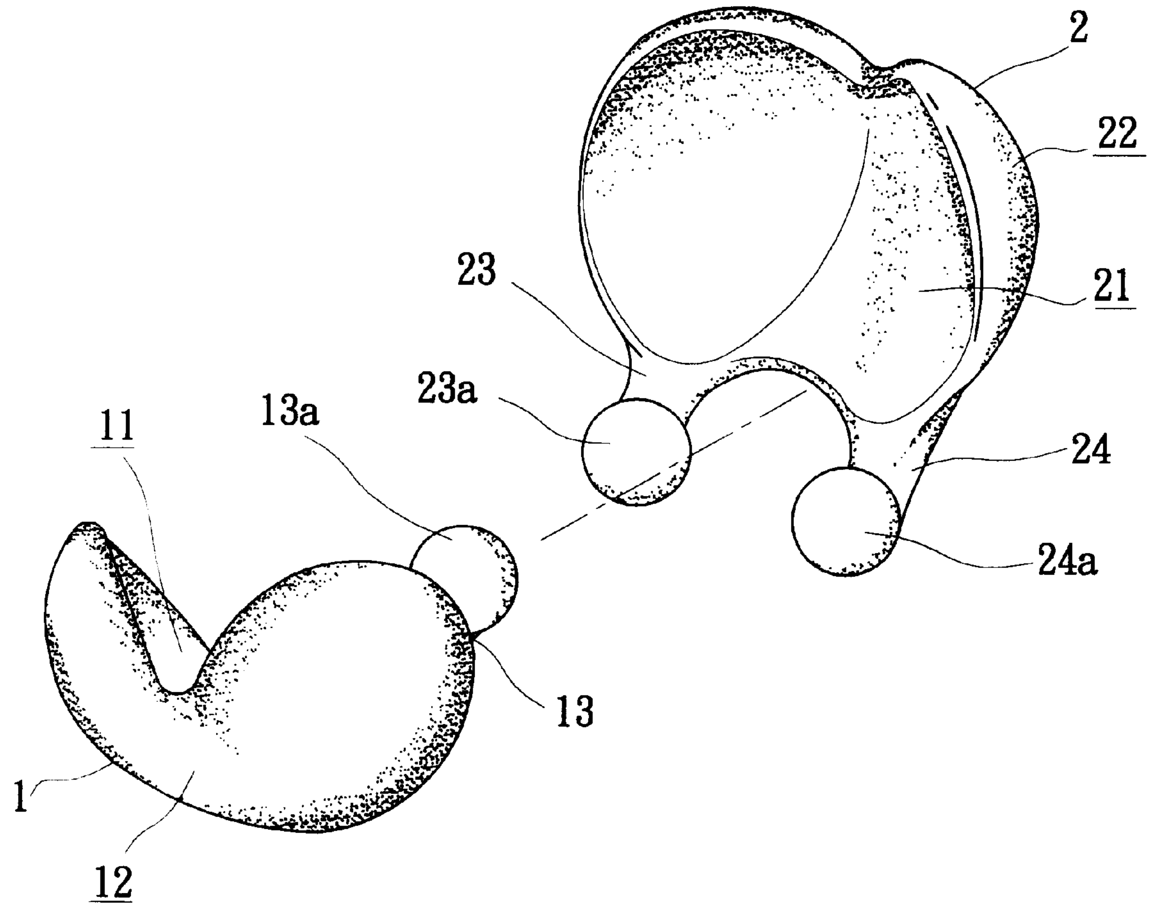
FIG. 1 a perspective exploded view of the decorative structure in accordance with a preferred embodiment of the present invention.
Figure 2:
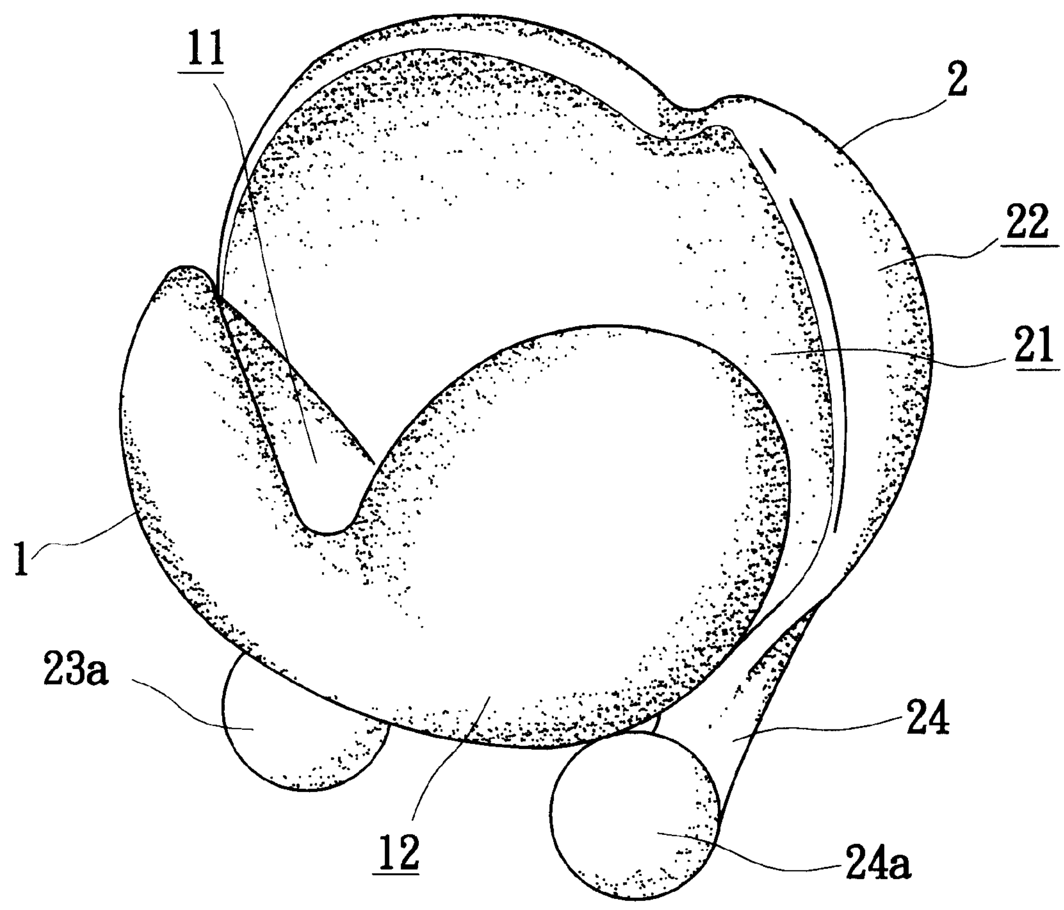
FIG. 2 is a perspective assembled view of the decorative structure of the present invention.
Figure 3:
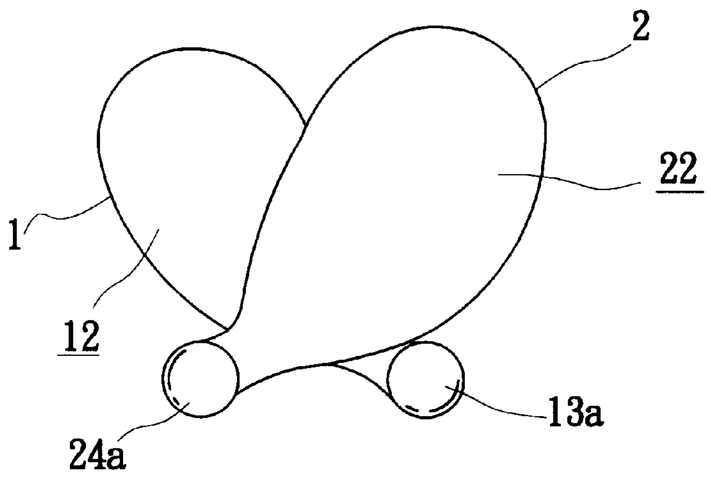
FIG. 3 is a right side view of the embodiment of FIG. 2.
Figure 4:
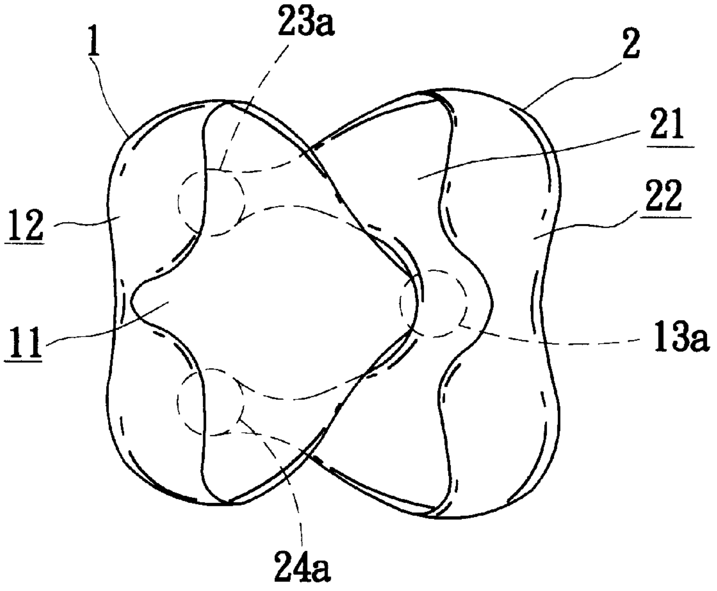
FIG. 4 is a top view of the embodiment of FIG. 2.
Figure 5:
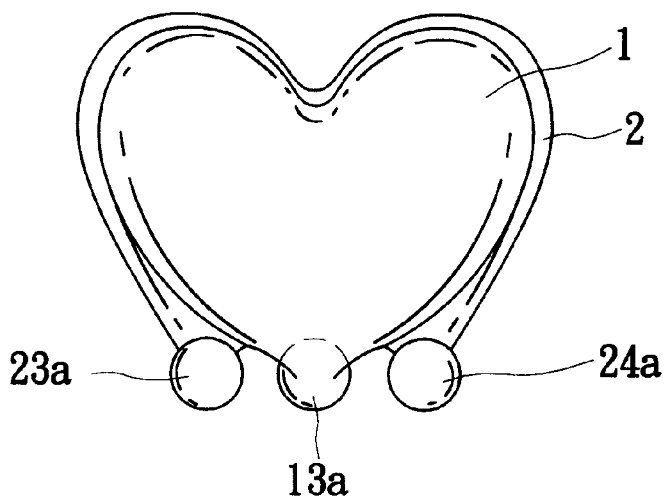
FIG. 5 is a front elevational view of the embodiment of FIG. 2.
Figure 6:
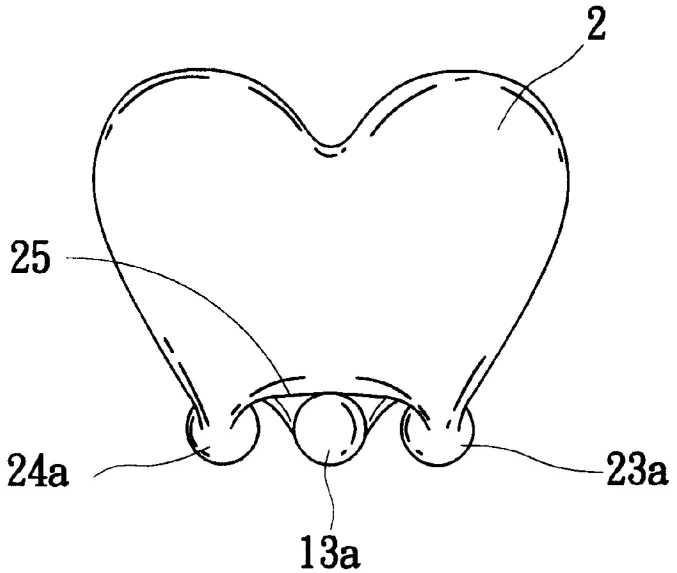
FIG. 6 is a rear elevational view of the embodiment of FIG. 2.

With reference to FIGS. 1 to 3, the present invention includes a first decorative unit 1 and a second decorative unit 2 which can be separably combined. FIG. 1 shows a state of separation of the two decorative units, while FIG. 2 shows a state of combination thereof. FIG. 3 shows a right side view of the combination of the two decorative units.

The first decorative unit 1 has a form of a casing having a convex surface 11 and a concave surface 12. The center of the bottom of the first decorative unit 1 is formed with a central extension post 13 facing the concave surface 12. The free end of the extension post 13 is formed with a bulge end 13*a*.

Similarly, the second decorative unit 2 has a form of a casing having a convex surface 21 and a concave surface 22. Two sides of the bottom of the second decorative unit 2 are formed with two extension posts 23, 24 spaced from each other by a certain distance and facing the concave surface 22. The free ends of the extension posts 23, 24 are respectively formed with bulge ends 23*a*, 24*a*. Accordingly, a bight bottom edge 25 is defined between the two extension posts 23, 24.

When combining the first decorative unit 1 with the second one 2, the central extension post 13 of the first decorative unit 1 is extended into the space between the two extension posts 23, 24 of the second decorative unit 2 by a certain angle. Then the combination of the two decorative units can be placed on a plane face (such as a desk face). At this time, the bulge end 13*a* of the extension post 13 of the first decorative unit 1 right abuts against the bight bottom edge 25 of the second decorative unit 2. Also, the two extension posts 23, 24 of the second decorative unit 2 extend to two lateral sides of the central extension post 13 of the first decorative unit 1 with the tops of the bulge ends 23*a*, 24*a* abut against the bottom of the convex surface 12 of the first decorative unit 1.

Accordingly, the central extension post 13 of the first decorative unit 1 and the two extension posts 23, 24 of the second decorative unit 2 together form an inter-engaged structure having three supporting points, whereby the first and second decorative units 1 and 2 can be stably rested on the plane face. In addition, after the first and second decorative units 1 and 2 are combined with each other, the opposite concave surfaces thereof define a receiving room in which a decorative article (such as a flower, a doll, a candle, etc.) can be placed. In a preferred embodiment of the present invention, the structure specifically serves as a candle stand.

Figure 7:
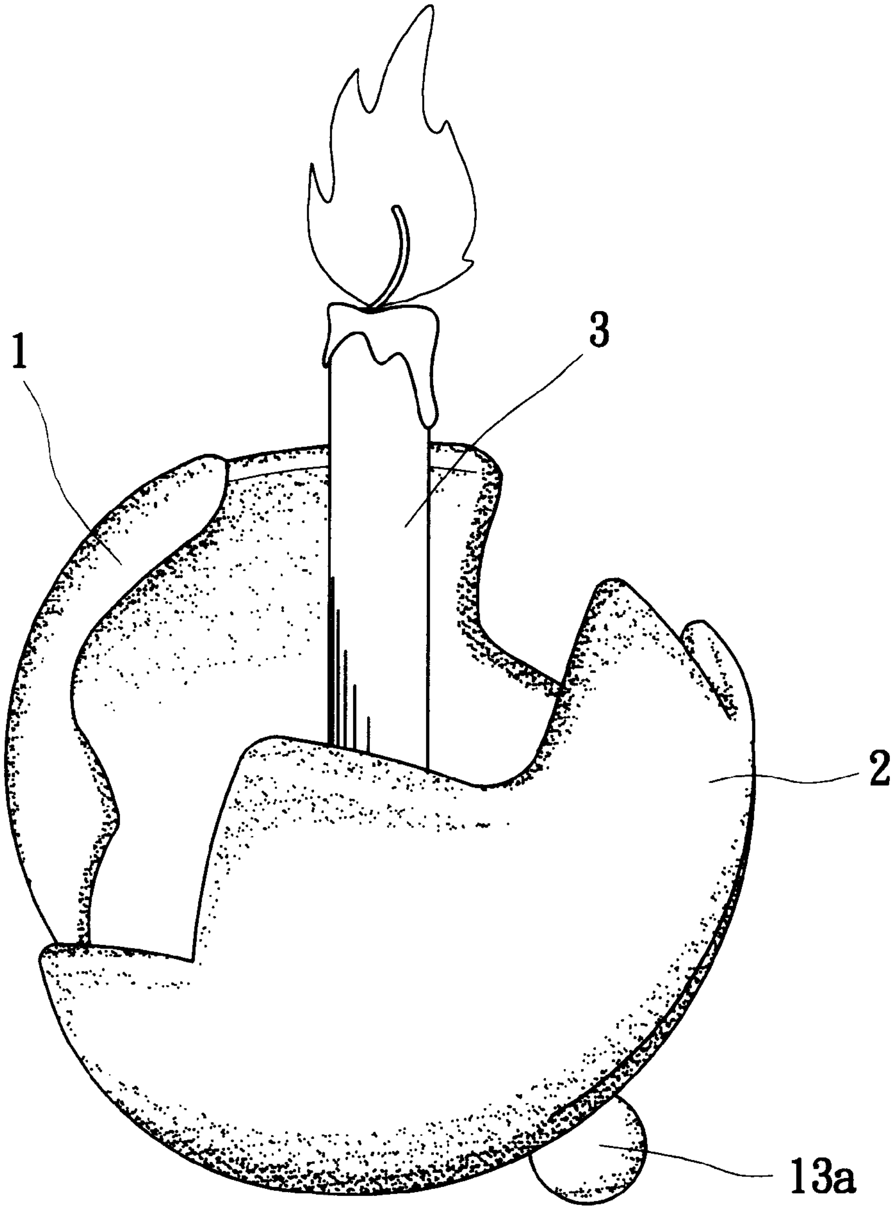
FIG. 7 is a perspective view of another embodiment of the decorative structure of the present invention.

The profiles of the first and second decorative units 1 and 2 can be modified. For example, as shown in FIG. 7, the tops of the decorative units are formed with saw tooth-like edges and a candle 3 is rested in the receiving room defined by the first and second decorative units.

The above embodiments are only used to illustrate the present invention, not intended to limit the scope thereof. Many modifications of the above embodiments can be made without departing from the spirit of the present invention.

What is claimed is:

1. A decorative unit structure comprising:

a first decorative unit having a convex surface and a concave surface, a center of a bottom of the first decorative unit being formed with a central extension post facing the concave surface, a free end of the extension post being formed with a bulge end; and a second decorative unit having a convex surface and a concave surface, two sides of a bottom of the second decorative unit being formed with two extension posts spaced from each other by a certain distance and facing the concave surface, free ends of the extension posts being respectively formed with bulge ends, a bight bottom edge being defined between the two extension posts, whereby when combining the first decorative unit with the second decorative unit, the central extension post of the first decorative unit is extended into the space between the two extension posts of the second decorative unit with the bulge end of the extension post of the first decorative unit right abutting against the bight bottom edge of the second decorative unit, the two extension posts of the second decorative unit also extending to two lateral sides of the central extension post of the first decorative unit with the tops of the bulge ends of the two extension posts abutting against the bottom of the convex surface of the first decorative unit, whereby the central extension post of the first decorative unit and the two extension posts of the second decorative unit together form an inter-engaged structure having three supporting points which enable the first and second decorative units to be stably rested on a plane face.

2. The decorative unit structure as claimed in claim 1, wherein after the first and second decorative units are combined with each other, the opposite concave surfaces of the first and second decorative units define therebetween a receiving room for a decorative article to rest therein.

* * * * *